United States Patent
Mueller et al.

(10) Patent No.: US 10,960,972 B2
(45) Date of Patent: Mar. 30, 2021

(54) ROTORCRAFT MASTS HAVING A NONINTEGRAL RACEWAY

(71) Applicant: Textron Innovations Inc., Providence, RI (US)

(72) Inventors: Russell Lee Mueller, Coppell, TX (US); Charles Hubert Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 449 days.

(21) Appl. No.: 16/148,154

(22) Filed: Oct. 1, 2018

(65) Prior Publication Data

US 2020/0102072 A1 Apr. 2, 2020

(51) Int. Cl.
*B64C 27/14* (2006.01)
*B23K 20/02* (2006.01)
*B64F 5/10* (2017.01)
*B64C 29/00* (2006.01)

(52) U.S. Cl.
CPC .......... *B64C 27/14* (2013.01); *B23K 20/023* (2013.01); *B64C 29/0033* (2013.01); *B64F 5/10* (2017.01)

(58) Field of Classification Search
CPC ....... B64C 27/14; B64C 29/0033; B64F 5/10; B23K 20/023
See application file for complete search history.

(56) References Cited

U.S. PATENT DOCUMENTS

| 4,580,945 | A | * | 4/1986 | Miller | B64C 27/32 416/134 A |
|---|---|---|---|---|---|
| 7,938,628 | B2 | | 5/2011 | Lin | |
| 10,017,247 | B1 | * | 7/2018 | Elliott | B64C 27/06 |
| 2020/0031463 | A1 | * | 1/2020 | Mueller | F16C 25/083 |

* cited by examiner

*Primary Examiner* — Justin M Benedik
(74) *Attorney, Agent, or Firm* — Lawrence Youst PLLC

(57) ABSTRACT

A propulsion assembly for a rotorcraft includes a mast including a distal ridge and a proximal ridge forming a retaining pocket therebetween, a raceway receivable by the retaining pocket to form a press fit between the mast and the raceway and a mast bearing assembly including a plurality of bearings facing the mast to engage the raceway. The distal and proximal ridges are operable to reduce axial motion of the raceway along the mast, thereby securing the raceway in the retaining pocket.

20 Claims, 9 Drawing Sheets

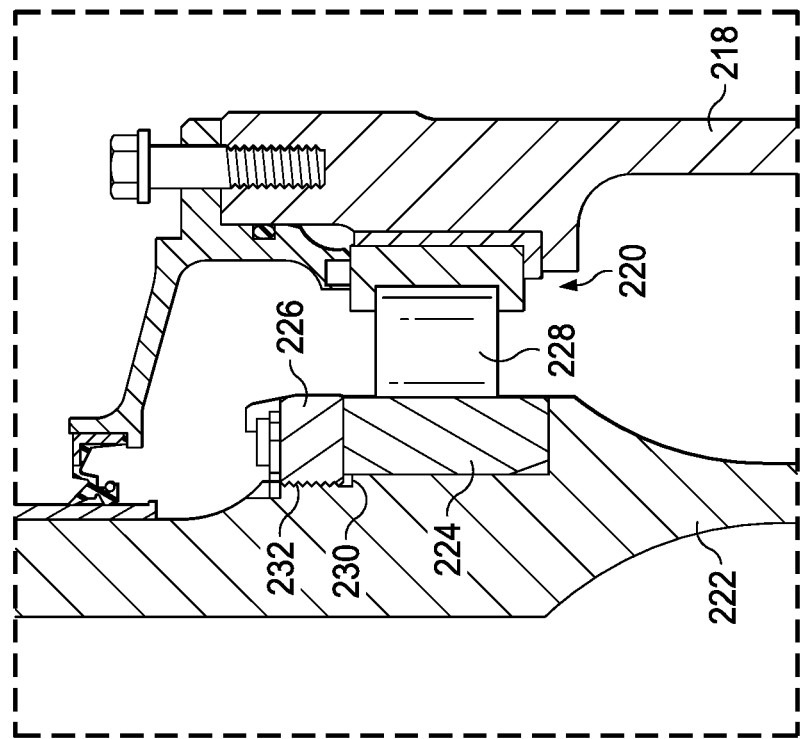
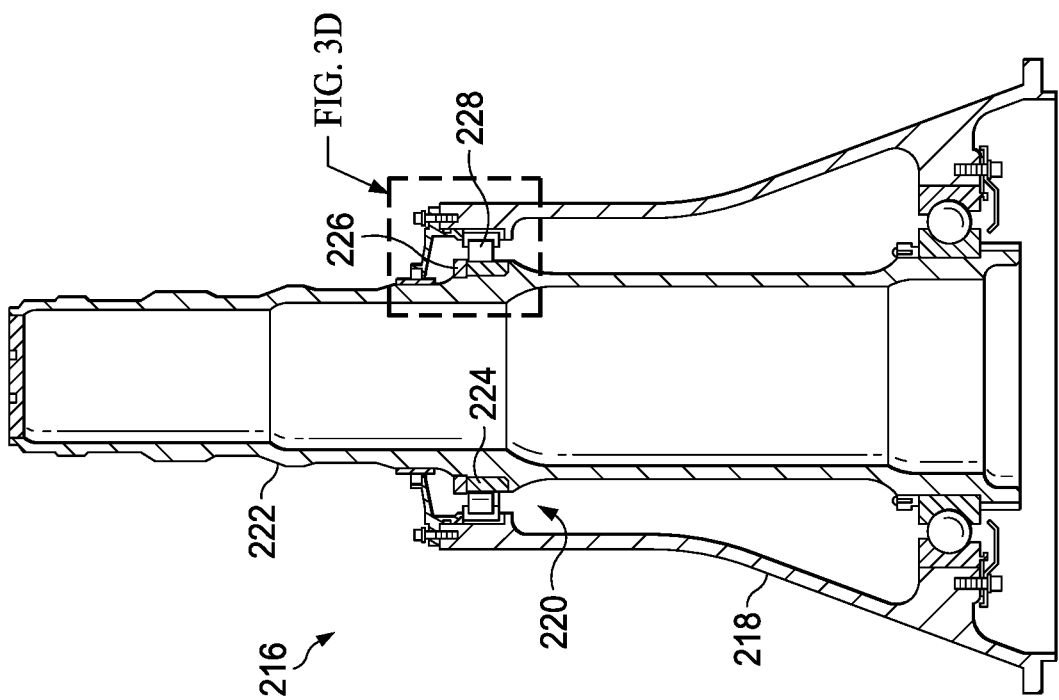
FIG. 3D (PRIOR ART)
FIG. 3C (PRIOR ART)

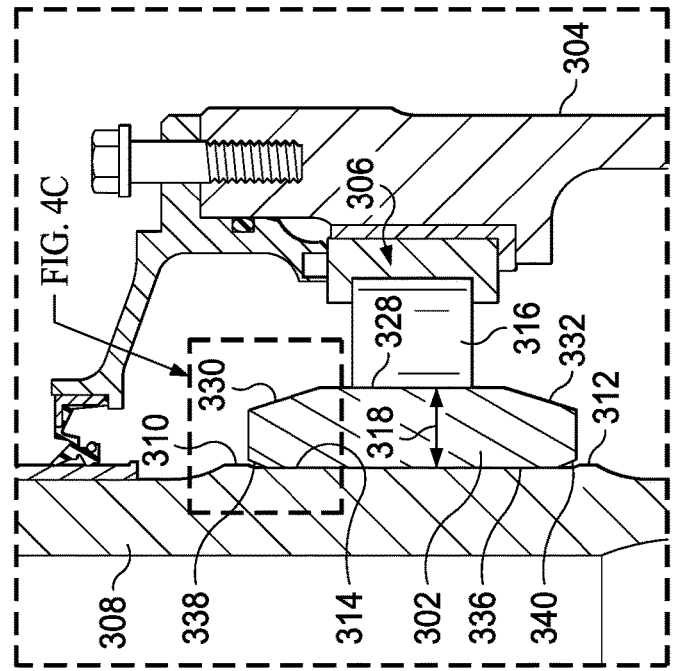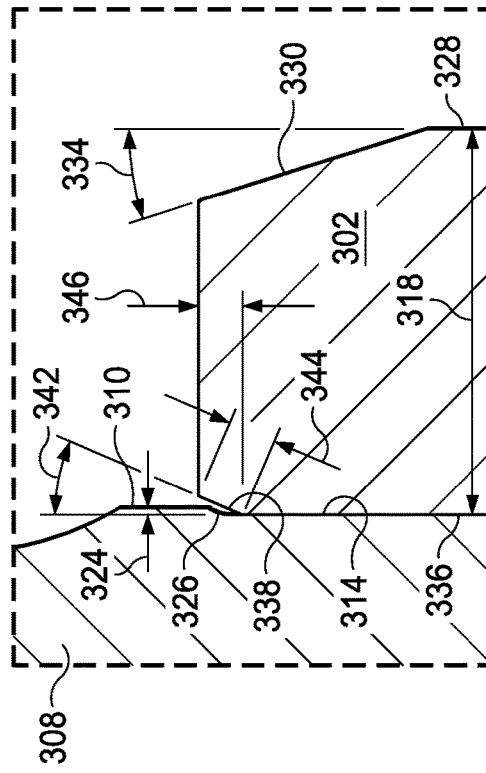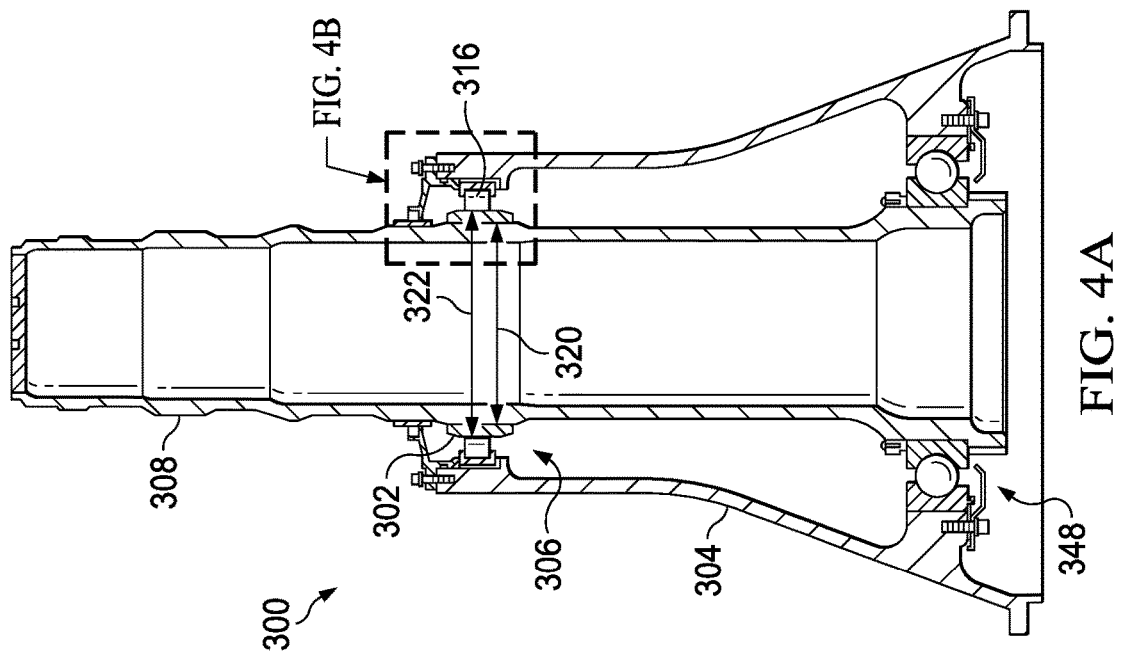

ROTORCRAFT MASTS HAVING A NONINTEGRAL RACEWAY

TECHNICAL FIELD OF THE DISCLOSURE

The present disclosure relates, in general, rotorcraft masts having a raceway that is engagable with a mast bearing assembly and, in particular, to rotorcraft masts having a nonintegral raceway that is press fit into a retaining pocket disposed between distal and proximal ridges of the mast.

BACKGROUND

Rotorcraft propulsion assemblies include a drive system that transfers rotational energy from a power source, such as an engine, to a rotor. Rotorcraft drive systems include a mast, which typically extends from a transmission and terminates at a rotor hub from which a number of rotor blades radially extend. Because masts carry shear, thrust and other loads during operation, propulsion assemblies often utilize a mast bearing assembly including bearings that engage with the mast to facilitate mast rotation while providing structural support for the mast against these loads. Raceways on the outer surface of the mast provide a surface against which the bearings of the mast bearing assembly engage. Because raceways are required to bear shear, thrust and other loads transmitted via the bearings, raceways are often harder than the remainder of the mast.

Propulsion assemblies that include integral raceways require that the mast be made from a steel allow that can be case hardened, such as by induction hardened or carburized, to form a hard surface to act as the raceway for the bearings. Such steel alloys, however, have a tendency to corrode in areas such as the hub spline and as a result, may require more frequent replacement. Integral raceways also require the entire mast to be replaced if the raceway is damaged. Nonintegral raceways may be used to overcome some of these drawbacks. Propulsion assemblies utilizing a nonintegral raceway may include a mast formed from a corrosion resistant material, such as a stainless steel, and a raceway formed from a conventional bearing steel alloy capable of high hardness. Current propulsion assemblies with nonintegral raceways have, however, encountered numerous other challenges. For example, in fastening the raceway to the mast, current nonintegral raceways require mast threads, nuts and other fasteners that cause structurally compromising stress concentrations, especially when experiencing induced cyclic loading during flight. Current nonintegral raceways also require more parts, thereby increasing the weight of the propulsion assembly and introducing additional stress points during operation. Accordingly, a need has arisen for nonintegral raceways capable of bearing high loads and preserving the structural integrity of masts while minimizing the weight, number of parts and stress points in the propulsion assembly.

SUMMARY

In a first aspect, the present disclosure is directed to a propulsion assembly for a rotorcraft including a mast including a distal ridge and a proximal ridge forming a retaining pocket therebetween, a raceway receivable by the retaining pocket to form a press fit between the mast and the raceway and a mast bearing assembly including a plurality of bearings facing the mast to engage the raceway. The distal and proximal ridges are operable to reduce axial motion of the raceway along the mast, thereby securing the raceway in the retaining pocket.

In some embodiments, the mast may include a material that is not case hardened. In certain embodiments, the mast may include stainless steel such as 13-8 stainless steel or 17-4 stainless steel. In some embodiments, the distal and proximal ridges may extend circumferentially around the mast. In certain embodiments, each ridge may have a radial depth in a range between 1 and 20 thousandths of an inch. In some embodiments, the raceway may be nonintegral with the mast. In certain embodiments, the raceway may be formed from a different material than the mast. In some embodiments, the raceway may be a hardened or through-hardened raceway. In certain embodiments, the raceway may be thermally fitted onto the mast. In some embodiments, the raceway may be an annular raceway. In certain embodiments, the raceway may include an inner surface having distal and proximal tapered edges. In other embodiments, the raceway may include an outer surface having distal and proximal tapered edges. In some embodiments, the raceway may include one of 52100 alloy steel or M50 alloy steel. In certain embodiments, the raceway may have a radial thickness in a range between 4 and 11 percent of the diameter of the mast. In some embodiments, the bearings may be roller bearings.

In a second aspect, the present disclosure is directed to a rotorcraft including a fuselage and a propulsion assembly coupled to the fuselage. The propulsion assembly includes a mast including a distal ridge and a proximal ridge forming a retaining pocket therebetween, a raceway receivable by the retaining pocket to form a press fit between the mast and the raceway and a mast bearing assembly including a plurality of bearings facing the mast to engage the raceway. The distal and proximal ridges are operable to reduce axial motion of the raceway along the mast, thereby securing the raceway in the retaining pocket.

In some embodiments, the propulsion assembly may include a top case housing the mast bearing assembly. In certain embodiments, the rotorcraft may be a helicopter and the propulsion assembly may be a main rotor assembly. In some embodiments, the rotorcraft may be a tiltrotor aircraft that includes a wing supported by the fuselage. In such embodiments, the propulsion assembly may include first and second propulsion assemblies each coupled to a respective outboard end of the wing, and the mast of each propulsion assembly may be rotatable relative to the fuselage between a plurality of positions including a substantially horizontal orientation in a forward flight mode and a substantially vertical orientation in a vertical takeoff and landing flight mode.

In a third aspect, the present disclosure is directed to a method for assembling a propulsion assembly of a rotorcraft including providing a mast including a distal ridge and a proximal ridge forming a retaining pocket therebetween; providing a raceway that is formed from a different material than the mast and is hardened; heating the raceway; thermally fitting the heated raceway onto the mast until the heated raceway is received by the retaining pocket of the mast; and allowing the heated raceway to cool to form a press fit between the raceway and the mast.

The method may include sliding the heated raceway past one of the ridges of the mast. The method may include hardening the raceway. The method may include forming distal and proximal tapered edges on an inner surface and an outer surface of the raceway; providing a mast formed from a material that is not case hardened and is selected from the group consisting of stainless steel and titanium and/or providing a raceway formed from a material selected from the group consisting of 52100 alloy steel and M50 alloy steel.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3C-3D are prior art drawings depicting a propulsion assembly utilizing a mast having a fastener-mounted raceway;

FIGS. 4A-4C are cross-sectional views of a propulsion assembly utilizing a mast having a nonintegral raceway in accordance with embodiments of the present disclosure;

DETAILED DESCRIPTION

Figure 1A:
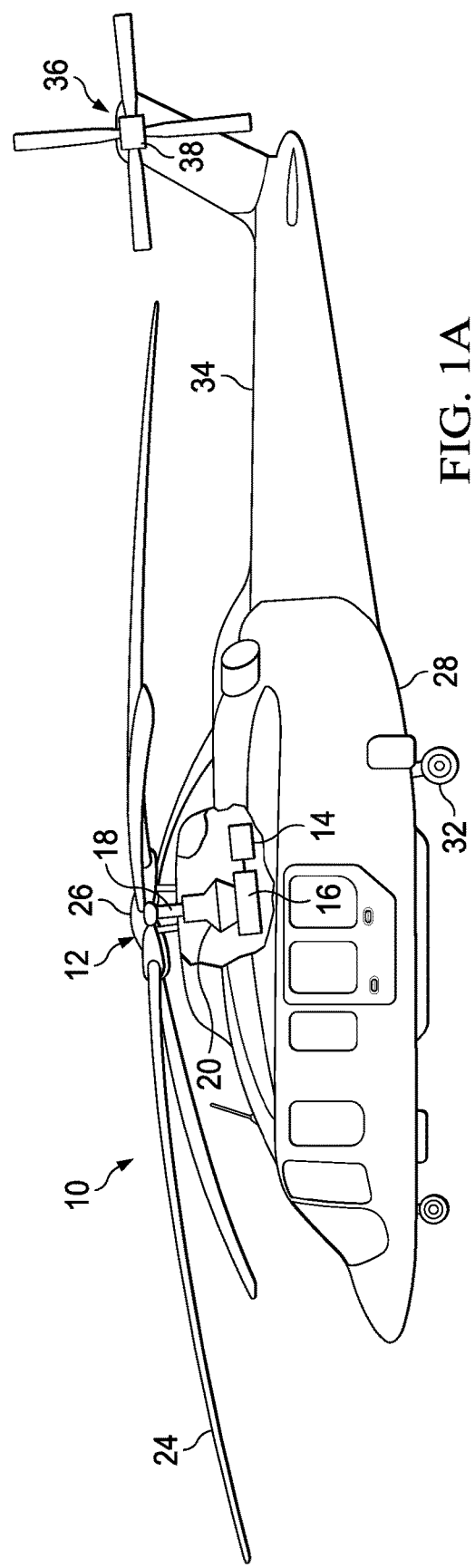
FIGS. 1A-1D are schematic illustrations of a helicopter having a main rotor assembly utilizing a mast having a nonintegral raceway in accordance with embodiments of the present disclosure.
Figure 1B:
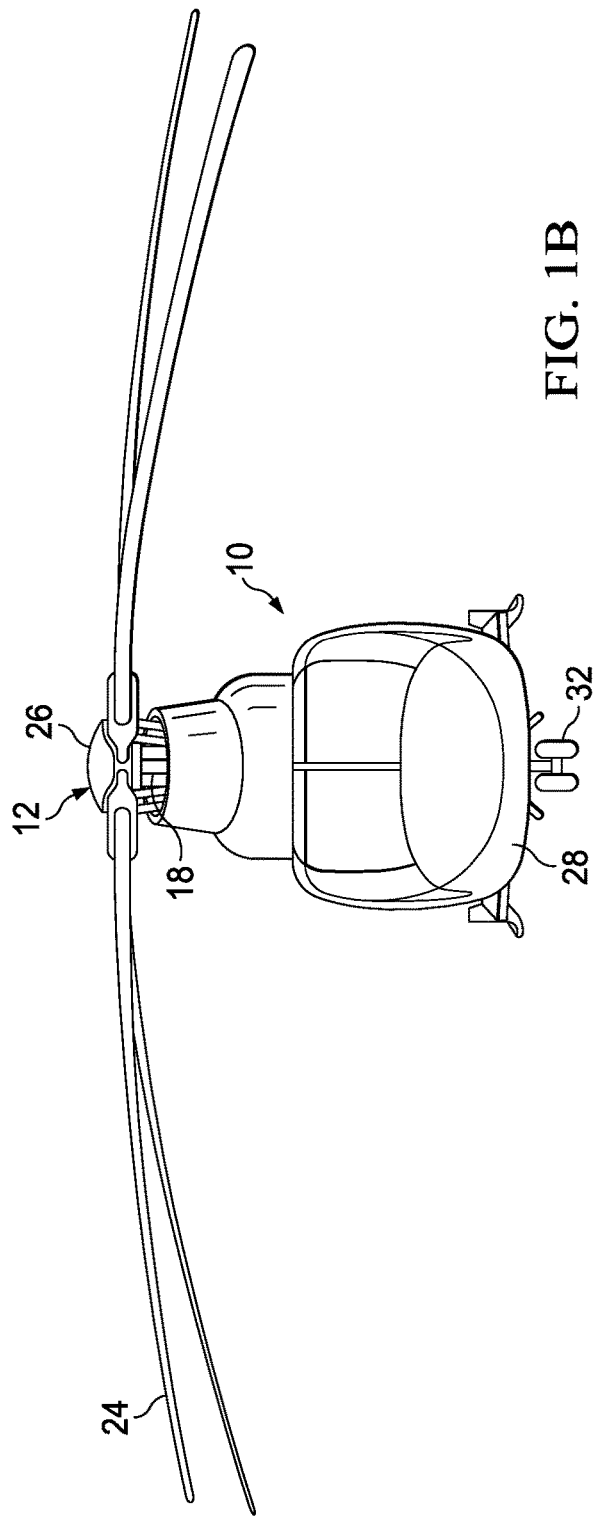
Figure 1C:
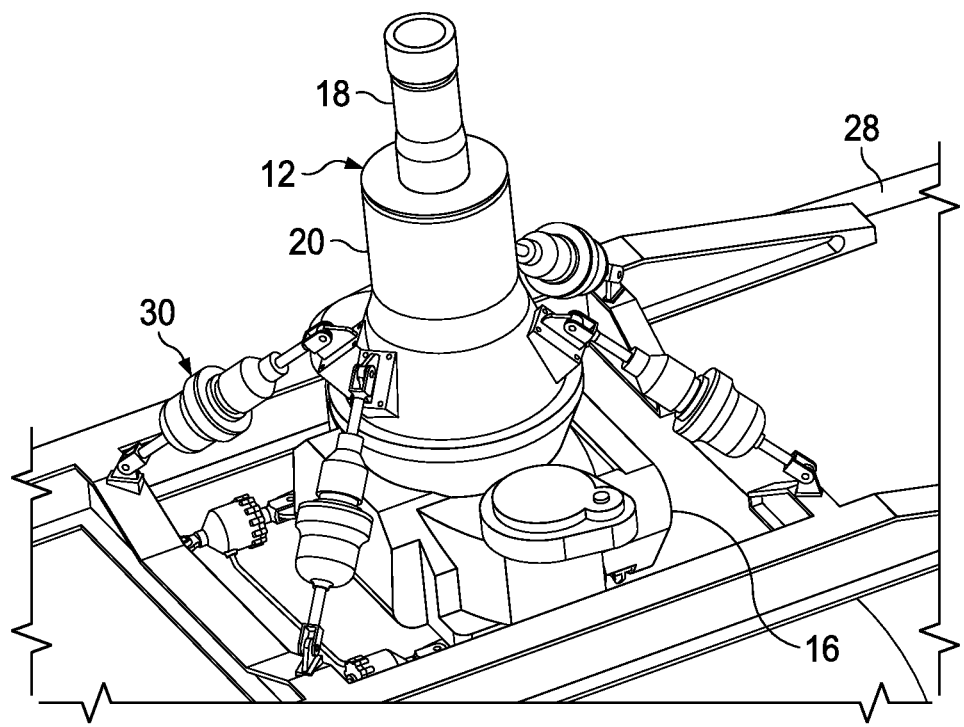

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a helicopter is schematically illustrated and generally designated 10. The primary propulsion assembly of helicopter 10 is a main rotor assembly 12 powered by an engine 14 via a main rotor gearbox 16. Mast 18 extends through a top case 20, which houses a mast bearing assembly 22 to facilitate the stable rotation of mast 18. Main rotor assembly 12 includes a plurality of rotor blade assemblies 24 extending radially outward from a main rotor hub 26. Main rotor assembly 12 is coupled to a fuselage 28. A vibration isolation system 30 may be utilized to isolate the vibration of main rotor assembly 12 from fuselage 18 and the components and passengers therein. Main rotor hub 26 is rotatable relative to fuselage 28. The pitch of rotor blade assemblies 24 can be collectively and/or cyclically manipulated to selectively control direction, thrust and lift of helicopter 10. A landing gear system 32 provides ground support for helicopter 10. A tailboom 34 extends from fuselage 28 in the aft direction. An anti-torque system 36 includes a tail rotor 38 that is rotatably coupled to the aft portion of tailboom 34. Anti-torque system 36 controls the yaw of helicopter 10.

Figure 1D:
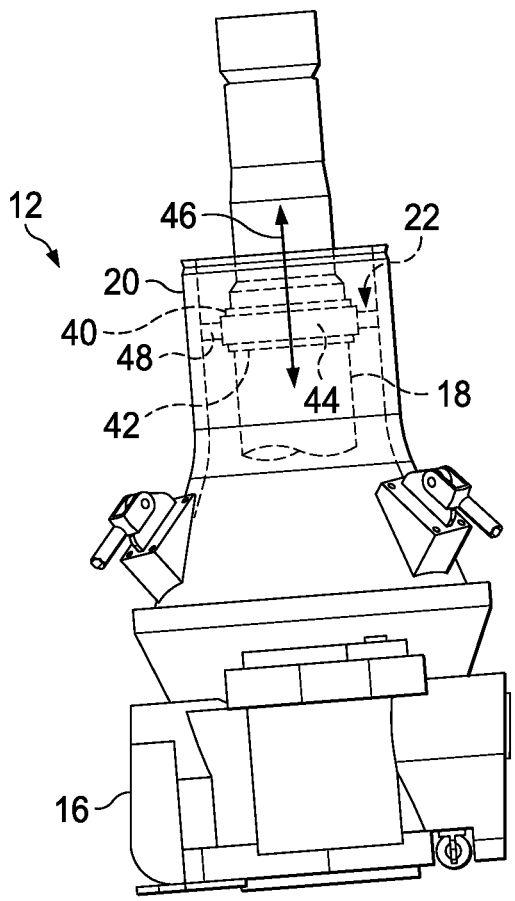

As best seen in FIG. 1D, mast 18 is machined or otherwise formed to include a distal ridge 40 and a proximal ridge 42, which structurally define a retaining pocket therebetween. A raceway 44, annular in shape and nonintegral with mast 18, is press fit with mast 18 at the retaining pocket formed by ridges 40, 42. The press fit formed between raceway 44 and mast 18 encompasses a variety of fits including an interference fit, friction fit, force fit, hydraulic dilation fit and other types of fits that do not require a fastener to couple raceway 44 to mast 18. Ridges 40, 42 secure raceway 44 by preventing or reducing axial motion 46 of raceway 44 along mast 18. In some embodiments, raceway 44 is formed from a different material, such as a different type of steel, than mast 18 so that raceway 44 can be hardened using any hardening technique while mast 18 may be formed from a material that is not case hardened sufficient to endure bearing stresses but exhibits suitable corrosion resistance properties. Roller bearings 48 of mast bearing assembly 22, which may carry reactions in the shear direction, circumferentially face mast 18 to engage raceway 44. Raceway 44 provides a smooth and hard surface on which roller bearings 48 may roll. In other embodiments, tail rotor 38 may also utilize a raceway to engage with bearings therein.

Figure 2A:
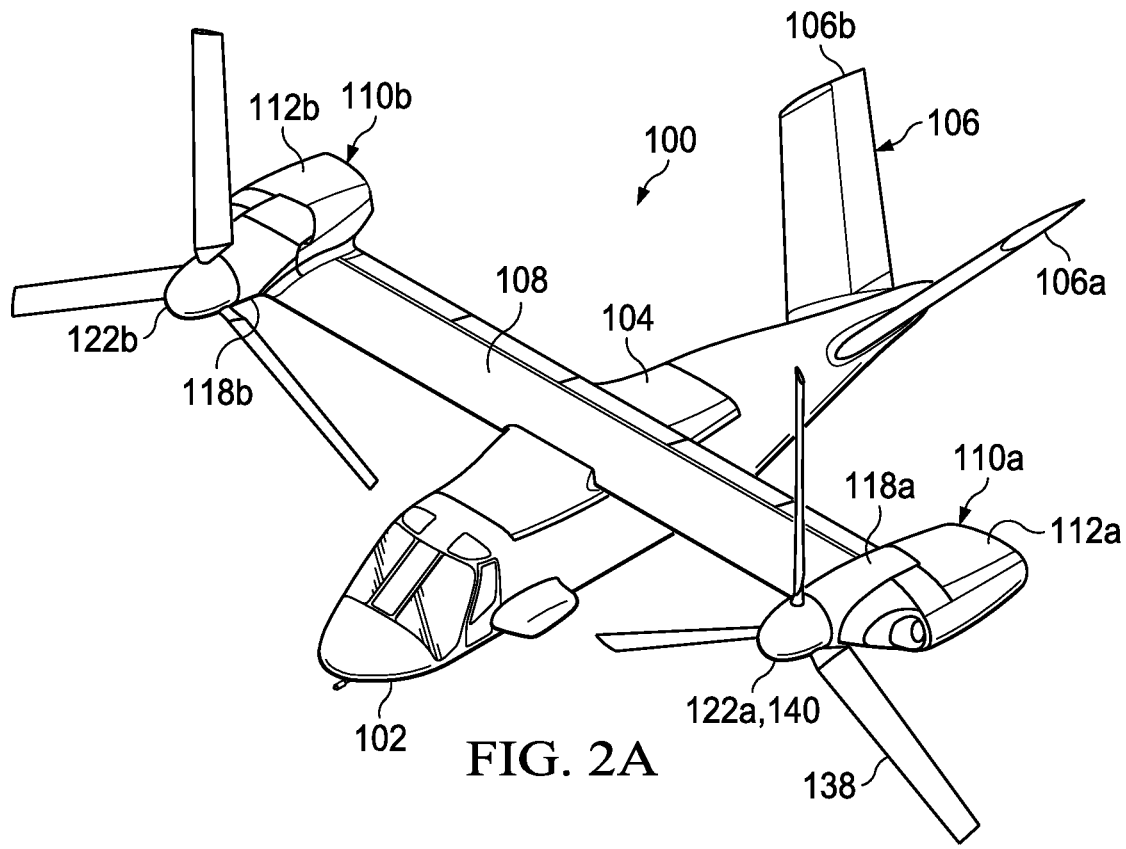
FIGS. 2A-2D are schematic illustrations of a tiltrotor aircraft having propulsion assemblies utilizing masts having nonintegral raceways in accordance with embodiments of the present disclosure.
Figure 2B:
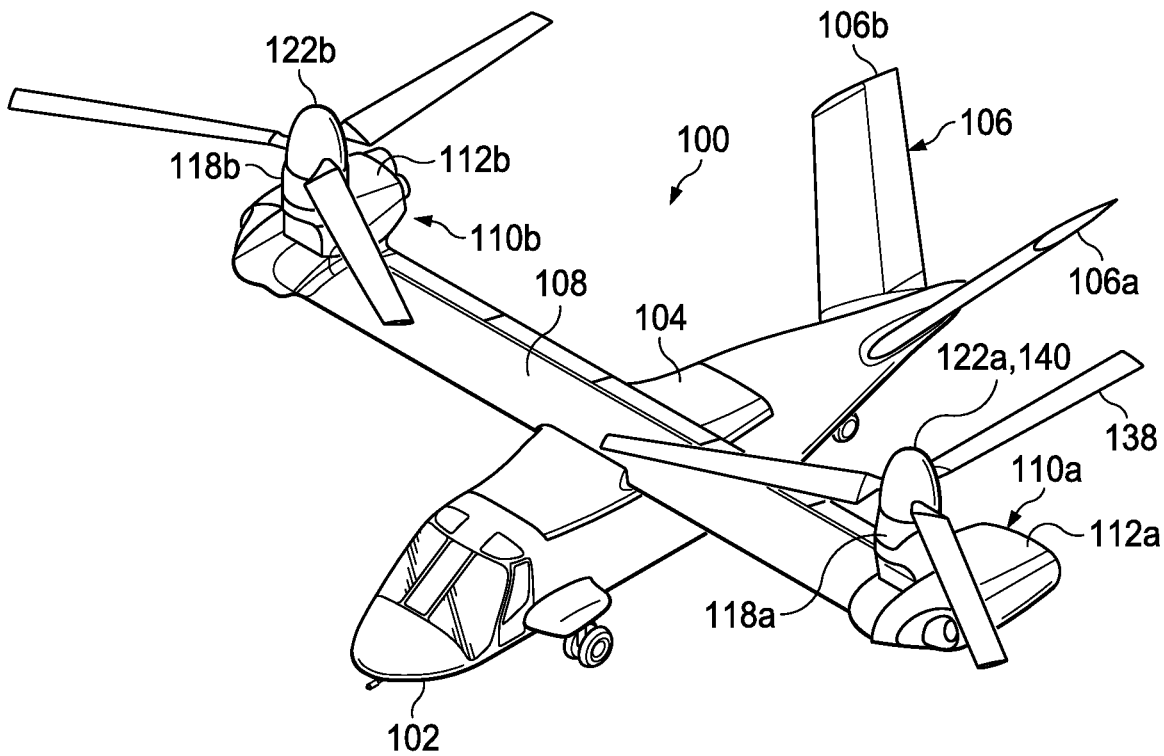
Figure 2C:
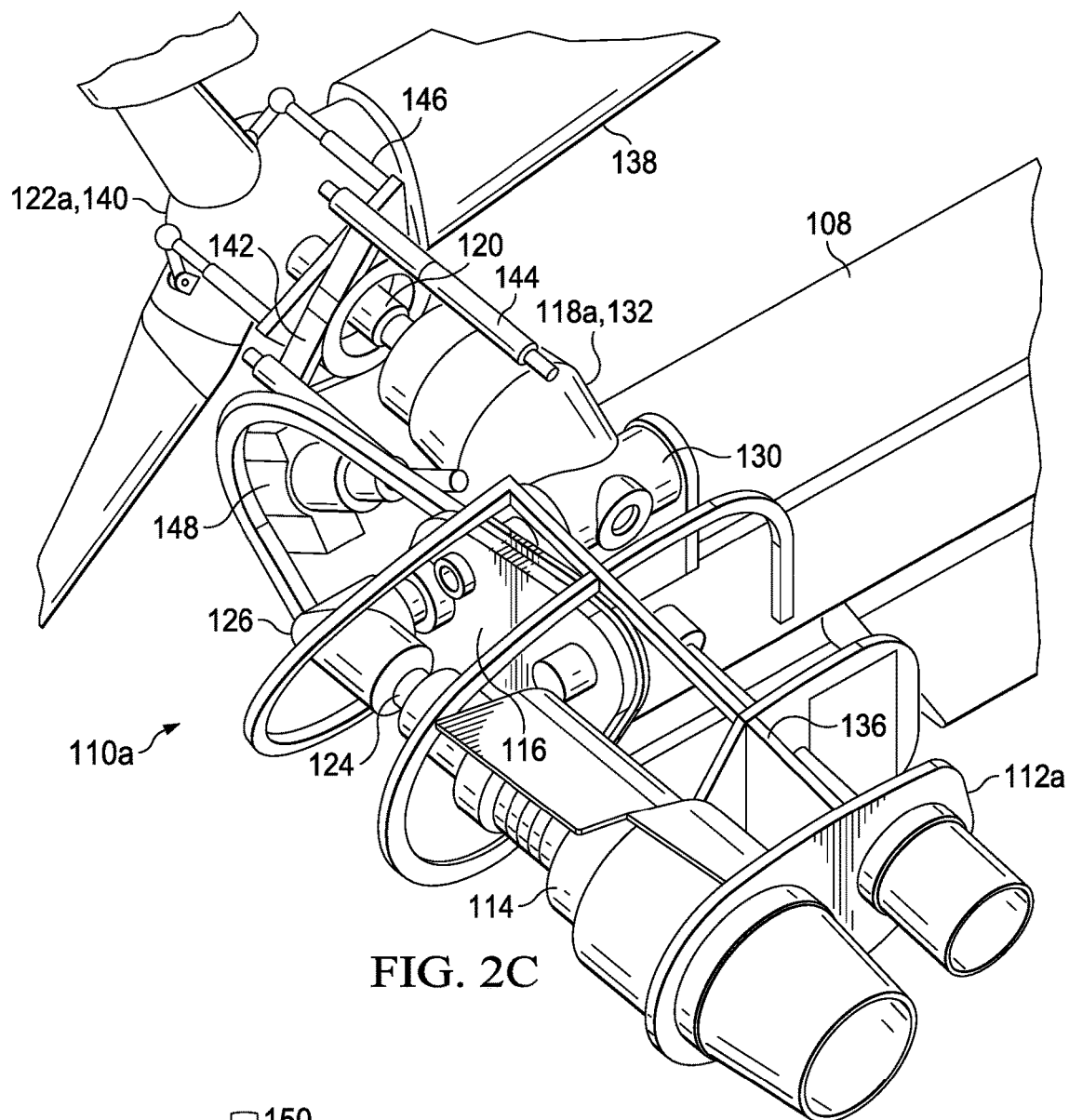
Figure 2D:
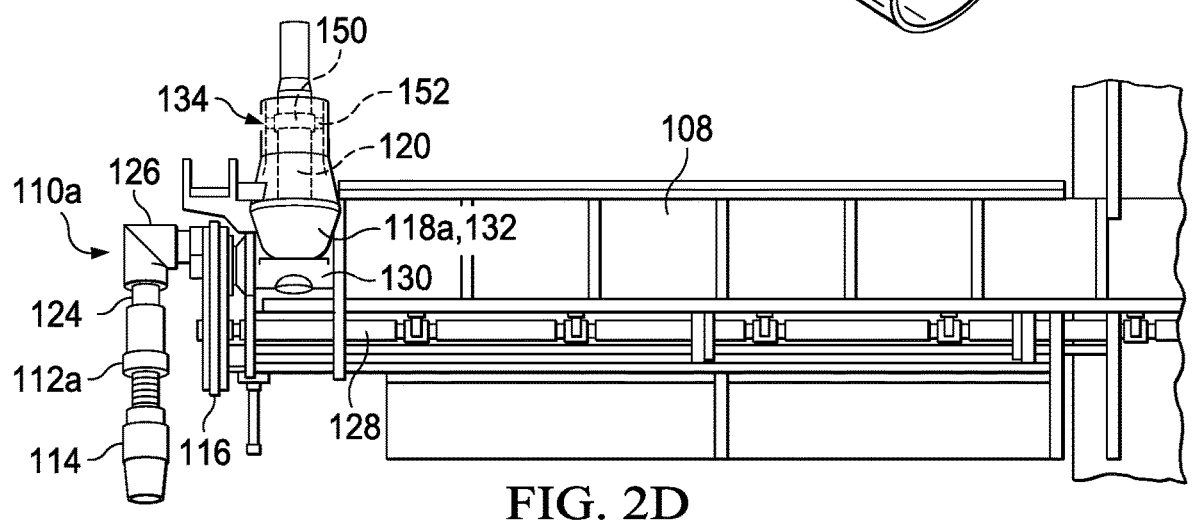

Referring to FIGS. 2A-2D in the drawings, a tiltrotor aircraft is schematically illustrated and generally designated 100. Tiltrotor aircraft 100 includes a fuselage 102, a wing mount assembly 104 and a tail assembly 106 including rotatably mounted tail members 106a, 106b having control surfaces operable for horizontal and/or vertical stabilization during forward flight. A wing member 108 is supported by wing mount assembly 104. Coupled to outboard ends of wing member 108 are propulsion assemblies 110a, 110b. Propulsion assembly 110a includes a nacelle depicted as fixed pylon 112a that houses an engine 114 and a transmission 116. Thus, the nacelle is fixed relative to wing member 108. In addition, propulsion assembly 110a includes a mast assembly 118a including a mast 120 that is rotatable relative to fixed pylon 112a, wing member 108 and fuselage 102 between a generally horizontal orientation, as best seen in FIGS. 2A, 2C and 2D, and a generally vertical orientation, as best seen in FIG. 2B. Propulsion assembly 110a also includes a proprotor assembly 122a having three proprotor blades which is rotatable responsive to torque and rotational energy provided via a rotor hub assembly and drive system mechanically coupled to engine 114 and transmission 116. Similarly, propulsion assembly 110b includes a nacelle depicted as fixed pylon 112b that houses an engine and transmission and a mast assembly 118b that is rotatable relative to fixed pylon 112b, wing member 108 and fuselage 102. Propulsion assembly 110b also includes a proprotor assembly 122b having three proprotor blades which is rotatable responsive to torque and rotational energy provided via a rotor hub assembly and drive system mechanically coupled to the engine and transmission housed by fixed pylon 112b.

FIG. 2A illustrates tiltrotor aircraft 100 in airplane or forward flight mode, in which proprotor assemblies 122a, 122b are rotating in a substantially vertical plane to provide a forward thrust enabling wing member 108 to provide a lifting force responsive to forward airspeed, such that tiltrotor aircraft 100 flies much like a conventional propeller driven aircraft. FIG. 2B illustrates tiltrotor aircraft 100 in helicopter or vertical takeoff and landing (VTOL) flight mode, in which proprotor assemblies 122a, 122b are rotating in a substantially horizontal plane to provide a lifting thrust, such that tiltrotor aircraft 100 flies much like a conventional helicopter. It should be appreciated that tiltrotor aircraft 100 can be operated such that proprotor assemblies 122a, 122b are selectively positioned between forward flight mode and VTOL flight mode, which can be referred to as a conversion flight mode. Even though tiltrotor aircraft 100 has been described as having one engine in each fixed pylon 112a, 112b, it should be understood by those having ordinary skill in the art that other engine arrangements are possible and are considered to be within the scope of the present disclosure including, for example, having a single engine which may be housed within fuselage 102 that provides torque and rotational energy to both proprotor assemblies 122a, 122b.

Referring now to FIGS. 2C and 2D, propulsion assembly 110a is disclosed in further detail. Propulsion assembly 110a is substantially similar to propulsion assembly 110b therefore, for sake of efficiency, certain features will be disclosed only with regard to propulsion assembly 110a. One having ordinary skill in the art, however, will fully appreciate an understanding of propulsion assembly 110b based upon the disclosure herein of propulsion assembly 110a. Engine 114 of propulsion assembly 110a is substantially fixed relative to wing 108. An engine output shaft 124 transfers power from engine 114 to a spiral bevel gearbox 126 that includes spiral bevel gears to change torque direction by 90 degrees from engine 114 to fixed transmission depicted as gearbox 116. Fixed gearbox 116 includes a plurality of gears, such as helical gears, in a gear train that are coupled to an interconnect drive shaft 128 and a quill shaft (not visible) that supplies torque to an input in spindle gearbox 130 of proprotor gearbox 132, a portion of which may include mast bearing assembly 134. Interconnect drive shaft 128 provides a torque path that enables a single engine of tiltrotor aircraft 100 to provide torque to both proprotor assemblies 122a, 122b in the event of a failure of the other engine. In the illustrated embodiment, interconnect drive shaft 128 includes a plurality of segments that share a common rotational axis.

Engine 114 is housed and supported in fixed pylon 112a (see FIGS. 2A and 2B) that may include features such as an inlet, aerodynamic fairings and exhaust, as well as other structures and systems to support and facilitate the operation of engine 114. The airframe of tiltrotor aircraft 100, which supports the various sections of tiltrotor aircraft 100 including fuselage 102, includes a propulsion assembly airframe section 136 that supports propulsion assembly 110a. Proprotor assembly 122a of propulsion assembly 110a includes three rotor blade assemblies 138 that are coupled to a rotor hub 140. Rotor hub 140 is coupled to mast 120 that is coupled to proprotor gearbox 132. Together, spindle gearbox 130, proprotor gearbox 132 and mast 120 are part of mast assembly 118a that rotates relative to fixed pylon 112a. In addition, it should be appreciated by those having ordinary skill in the art that mast assembly 118a may include different or additional components, such as a pitch control assembly depicted as swashplate 142, actuators 144 and pitch links 146, wherein swashplate 142 is selectively actuated by actuators 144 to selectively control the collective pitch and the cyclic pitch of rotor blade assemblies 138 via pitch links 146. A linear actuator, depicted as conversion actuator 148 of fixed pylon 112a, is operable to reversibly rotate mast assembly 118a relative to fixed pylon 112a, which in turn selectively positions proprotor assembly 122a between forward flight mode, in which proprotor assembly 122a is rotating in a substantially vertical plane, and VTOL flight mode, in which proprotor assembly 122a is rotating in a substantially horizontal plane. Raceway 150 is press fit onto mast 120 at a retaining pocket defined by at least two ridges on mast 120. Roller bearings 152 of mast bearing assembly 134 face mast 120 to engage raceway 150, thereby supporting mast 120. Raceway 150 provides a smooth and hard surface on which roller bearings 152 may roll. Raceway 150 is similar to raceway 44 of helicopter 10 except that it is adapted to tiltrotor aircraft 100, demonstrating the versatility and applicability of the raceway to a wide range of aviation environments.

It should be appreciated that helicopter 10 and tiltrotor aircraft 100 are merely illustrative of a variety of aircraft that can implement the embodiments disclosed herein. Indeed, propulsion assemblies utilizing masts 18, 120 and/or raceways 44, 150 may be implemented on any rotorcraft. Other aircraft implementations can include hybrid aircraft, tiltwing aircraft, quad tiltrotor aircraft, unmanned aircraft, gyrocopters, propeller-driven airplanes, compound helicopters, drones and the like. As such, those skilled in the art will recognize that propulsion assemblies utilizing masts 18, 120 and/or raceways 44, 150 can be integrated into a variety of aircraft configurations. It should be appreciated that even though aircraft are particularly well-suited to implement the embodiments of the present disclosure, non-aircraft vehicles and devices can also implement the embodiments.

Figure 3B:
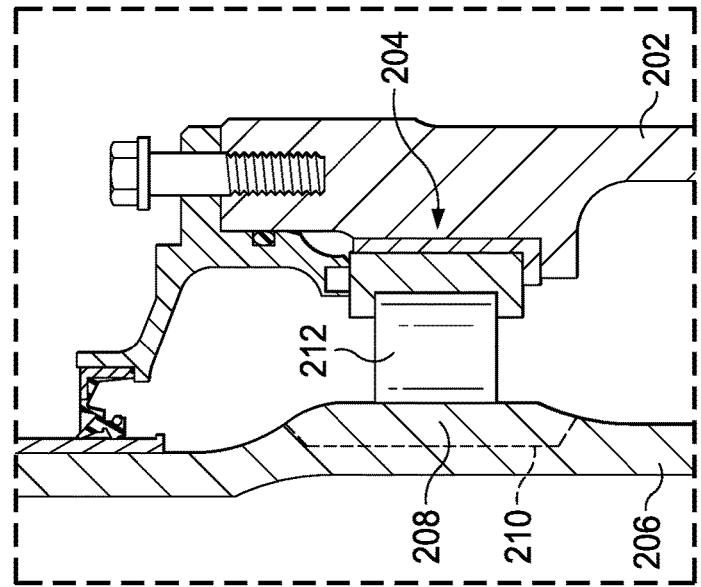
FIGS. 3A-3B are prior art drawings depicting a propulsion assembly utilizing a mast having an integral raceway.
Figure 3A:
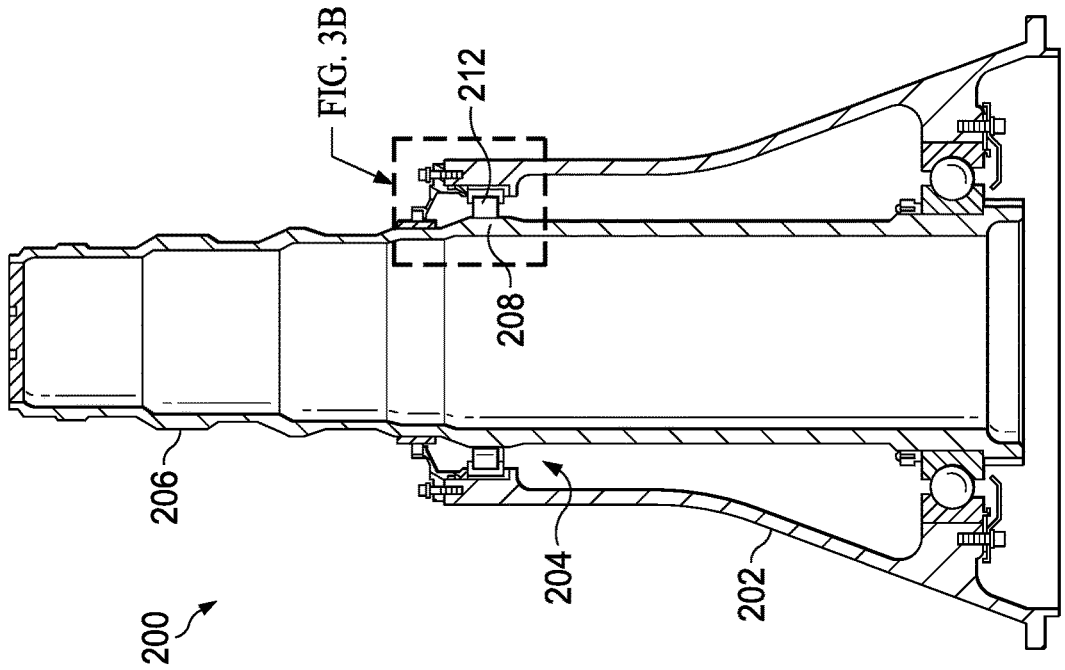

Referring to FIGS. 3A-3D in the drawings, various raceway configurations for propulsion assemblies are schematically illustrated. In FIGS. 3A and 3B, propulsion assembly 200 includes top case 202 in which mast bearing assembly 204 supports the stable rotation of mast 206. Propulsion assembly 200 utilizes an integral raceway configuration in which raceway 208 is integral with and formed from the same material as mast 206. Portion 210 of mast 206 that forms raceway 208 is heat treated to provide a hard and durable surface on which roller bearings 212 may roll. In one non-limiting example, portion 210 of mast 206 that forms raceway 208 may be heat treated to a depth in a range between 25 and 150 thousandths of an inch, or more particularly in a range between 50 and 100 thousandths of an inch. Because the mast itself is heat treated to form raceway 208, the material from which mast 206 may be formed is restricted to steel that can be induction hardened such as 4340 alloy steel or steel that can be carburized such as X53 alloy steel. Steel types that can be case hardened or locally hardened to form sufficiently effective raceways, however, tend to have poor corrosion resistance, and may, for example, have a tendency to corrode at the hub spline and require replacement at high intervals depending on the working environment. While corrosion issues can be mitigated by using stainless (CRES) steel for mast 206, the integral raceway configuration of propulsion assembly 200 requires a case hardened surface which cannot be sufficiently achieved with stainless steel material.

In FIGS. 3C and 3D, propulsion assembly 216 includes top case 218, in which mast bearing assembly 220 supports the stable rotation of mast 222. Raceway 224 utilized by propulsion assembly 216 is not integral with mast 222. Raceway 224 is retained or coupled onto mast 222 using a threaded lock ring 226, nuts and other fasteners. Because raceway 224 is not integral with mast 222, raceway 224 may be hardened independently of mast 222. Raceway 224 may also be formed from a material that can be sufficiently hardened to act as a raceway for roller bearings 228, while mast 222 may be formed from a corrosion resistant material, such as stainless steel, that is not case hardened sufficient to endure bearing stresses. The fasteners, such as lock ring 226, used to retain raceway 224 on mast 222, however, present other drawbacks for propulsion assembly 216. For example, the local roller bearing and contact stress loads around raceway 224 and bending stresses of mast 222 require a tight fit between mast 222 and raceway 224. Fasteners 226 leave undesirable spaces, such as space 230, between mast 222 and raceway 224, which may cause undesirable and structurally compromising motions in response to these contact and bending stress loads. Threads 232 also require intricate machining that cause local stress concentrations in response to mast bending, thereby generating structural fatigue. The stress concentrations occurring at threads 232 are in an undesirable location due to induced cyclic loading during flight. Fastening raceway 224 onto mast 222 using fasteners such as lock ring 226 also requires additional parts, which add more weight, cost and complexity to the rotorcraft.

Referring to FIGS. 4A-4C in the drawings, propulsion assembly 300 utilizing nonintegral raceway 302 of the illustrative embodiments is schematically illustrated. Propulsion assembly 300 includes top case 304, which houses mast bearing assembly 306 to support the stable rotation of mast 308. Mast 308 includes distal ridge 310 and proximal ridge 312, which form retaining pocket 314 therebetween. Raceway 302 is received and retained at retaining pocket 314, forming a press fit between raceway 302 and mast 308 to retain raceway 302. In addition to the press fit between raceway 302 and mast 308, distal and proximal ridges 310, 312 prevent or reduce translation or axial motion of raceway 302 along mast 308 due to loads or deflections during operation, thereby securing raceway 302 within retaining pocket 314. Distal and proximal ridges 310, 312 extend circumferentially around mast 308, although in other embodiments distal and proximal ridges 310, 312 may extend only partially around the circumference of mast 308 and may each be formed from two or more ridges instead of a single circumferential ridge.

Because raceway 302 is not integral with mast 308, raceway 302 may be formed from a different material than mast 308. In particular, raceway 302 may be formed from a high strength, high hardness steel capable of being hardened or through-hardened such as a material used to form roller bearings in high stress aviation applications. In the illustrated embodiment, raceway 302 is a through-heated raceway that provides a smooth, hard and durable surface against which roller bearings 316 may engage. In one non-limiting example, raceway 302 may be hardened in a range between 50 and 70 on the Rockwell hardness scale. Raceway 302 may be formed from a material such as 52100 alloy steel or M50 alloy steel that is capable of being hardened independently of mast 308. Mast 308, however, is not restricted to being formed from materials capable of being case hardened to a level necessary for raceway 302. Mast 308 may instead be formed from a material that is corrosion resistant such as PH13-8Mo, 17-4PH or 15-5PH stainless steels or Ti-6Al-4V titanium. In one non-limiting example, mast 308 may have a hardness in a range between 30 and 45 on the Rockwell hardness scale. In the illustrated embodiment, mast 308 is formed from a material that has corrosion resistance properties but is not case hardened thereby eliminating the cost and time required to case harden the surface to a lever necessary for raceway 302.

Using the illustrative embodiments, a raceway of sufficiently through-hardened material can be mounted to a stainless steel mast having corrosion resistance properties without the use of superfluous fasteners or other parts, thereby reducing the weight and complexity of propulsion assembly 300. Unlike propulsion assembly 216 in FIGS. 3C and 3D, the press fit between raceway 302 and mast 308 does not require threads or threaded fasteners that create stress concentrations at or around raceway 302 during operation. Ridges 310, 312 do not create stress rising features that may compromise the structural integrity of propulsion assembly 300. In contrast to the integral raceway of FIGS. 3A and 3B in which only a shallow surface portion of the mast is case hardened, the illustrative embodiments allow for a thicker raceway to withstand the loads and stresses exerted by roller bearings 316. Also unlike the integral raceway of FIGS. 3A and 3B, raceway 302 may be replaced independently of mast 308 if raceway 302 is damaged.

The absolute and relative dimensions of raceway 302 and mast 308 may vary widely depending on the aircraft or application in which raceway 302 and mast 308 are implemented. In one non-limiting example, radial thickness 318 of raceway 302 relative to mast diameter 320 may range between 2 and 20 percent, or more particularly between 4 and 11 percent such as approximately 8 percent of mast diameter 320. In another non-limiting example, outer diameter 322 of raceway 302 relative to mast diameter 320 may range between 101 and 130 percent, or more particularly between 110 and 120 percent such as approximately 116 percent of mast diameter 320. In terms of absolute dimensions for a piloted helicopter, in one non-limiting example mast diameter 320 may range between 4 and 16 inches, or more particularly between 6 and 10 inches such as approximately 8 inches. In another non-limiting example for a piloted helicopter, outer diameter 322 of raceway 302 may range between 5 and 17 inches, or more particularly between 7 and 11 inches such as approximately 9.5 inches. Radial depth 324 of ridges 310, 312 may also vary widely, and in some cases depend on mast diameter 320 and/or the temperature of raceway 302 during assembly. For example, it may be desirable to machine ridges 310, 312 to a radial depth that is as high as possible while still being able to squeeze raceway 302 into retaining pocket 314 without compromising either raceway 302 or mast 308 during assembly. In one non-limiting example, each ridge 310, 312 has radial depth 324 in a range between 1 and 20 thousandths of an inch, or more particularly between 1 and 10 thousandths of an inch such as approximately 5 thousandths of an inch. In another non-limiting example, each ridge 310, 312 may have radial depth 324 relative to mast diameter 320 in a range between 0.001 and 1 percent, or more particularly between 0.01 and 0.1 percent such as approximately 0.06 percent of mast diameter 320. Tapered sidewall 326 of each ridge 310, 312 may have any length depending on the desired taper, such as a length in a range between 0.04 and 0.2 inches such as approximately 0.12 inches.

Outer surface 328 of raceway 302 may include or form distal and proximal tapered edges 330, 332. Tapered edges 330, 332 may have any length and form any acute taper angle 334. Inner surface 336 of raceway 302 may include distal and proximal tapered edges 338, 340. Tapered edges 338, 340 on inner surface 336 of raceway 302 may form any acute taper angle 342. Tapered edges 338, 340 may have any length 344, including, for example, a length in a range between 0.01 and 0.15 inches such as approximately 0.06 inches. Tapered edges 338, 340 may also have any maximum breakout length 346, including a maximum breakout length in a range between 0.01 and 0.13 inches such as approximately 0.07 inches.

Mast bearing assembly 306 also includes a thrust bearing assembly 348 that may carry shear and thrust loads of propulsion assembly 300. In some embodiments, thrust bearing assembly 348 may include a nonintegral raceway with an outer concavity to contour the ball bearings therein, and such concave nonintegral raceway may be press fit onto mast 308. In other embodiments, the ball bearings of thrust bearing assembly 348 may be replaced with roller bearings and may engage with a raceway similar to raceway 302. In yet other embodiments, roller bearings 316 may instead be ball bearings and outer surface 328 of raceway 302 may form a concave surface to contour the ball bearings.

Figure 5A:
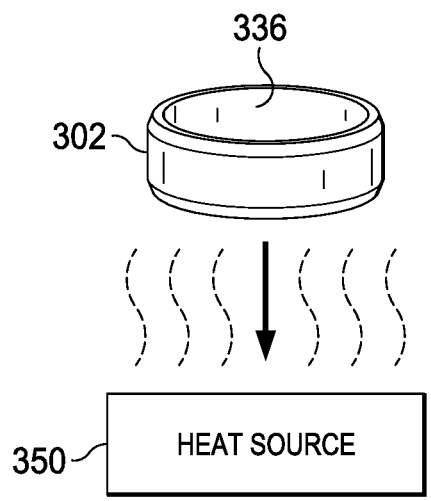
FIGS. 5A-5D are isometric views of various stages of assembling of a mast having a nonintegral raceway for a rotorcraft in accordance with embodiments of the present disclosure.
Figure 5B:
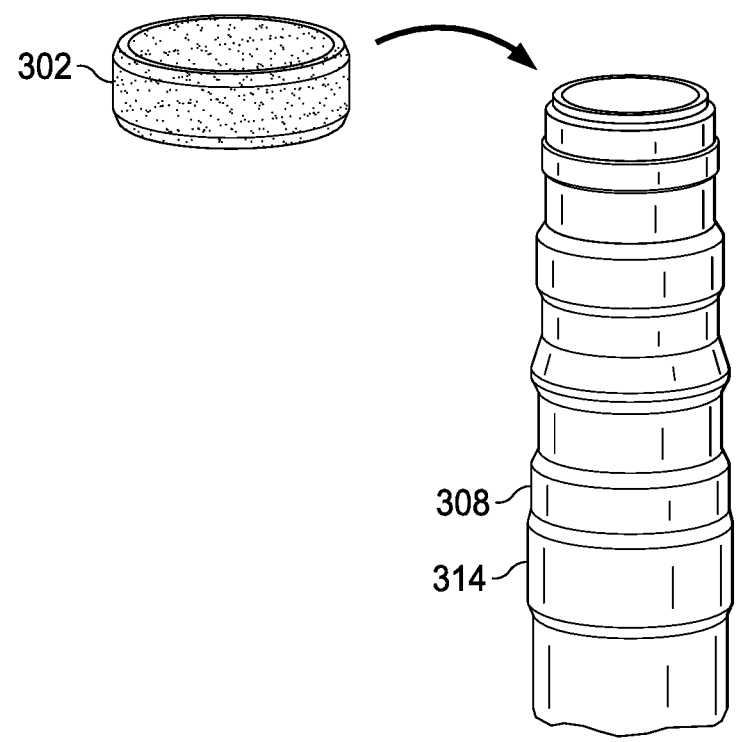
Figure 5C:
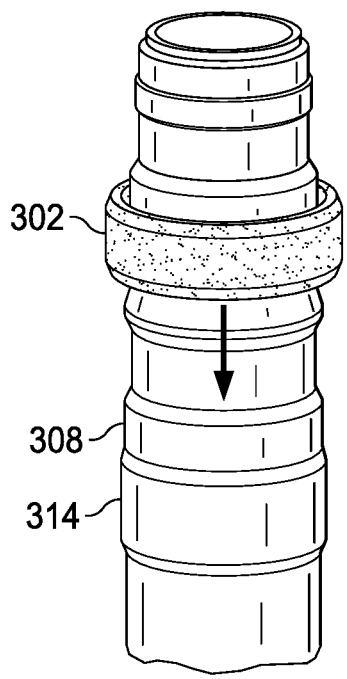
Figure 5D:
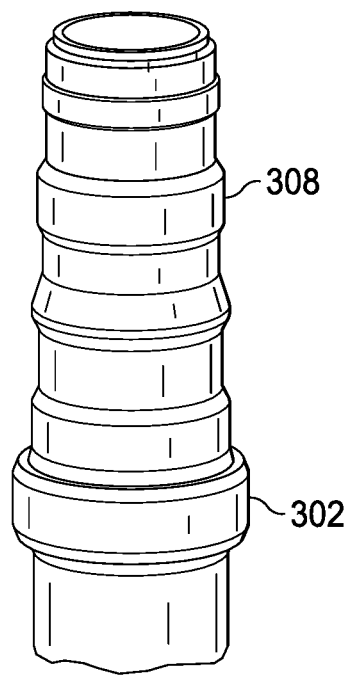

Referring to FIGS. 5A-5D in the drawings, a method for assembling a propulsion assembly of a rotorcraft is schematically illustrated. In FIG. 5A, raceway 302, which has previously been through hardened, induction hardened, carburized or otherwise suitably hardened using any material hardening technique, is thermally expanded using a heat source 350. In FIG. 5B, mast 308, which has been machined to form distal and proximal ridges 310, 312 (see FIG. 4C), has been provided. Heated raceway 302 is thermally fitted on mast 308 while mast 308 is kept at approximately room temperature or any other temperature lower than heated raceway 302. In FIG. 5C, mast 308 extends through heated raceway 302 as heated raceway 302 moves down mast 308 until heated raceway 302 is received by retaining pocket 314 of mast 308. It is noted that heated raceway 302 is moved past distal ridge 310 (see FIG. 4C) of mast 308 and into retaining pocket 314 while raceway 302 is thermally expanded. In FIG. 5D, raceway 302 is allowed to cool, for example by air-cooling, to form a press fit between mast 308 and raceway 302. In some embodiments, raceway 302 may be allowed to cool back to approximately room temperature. In this manner as well as others, raceway 302 may be thermally fitted onto mast 308.

Figure 6:
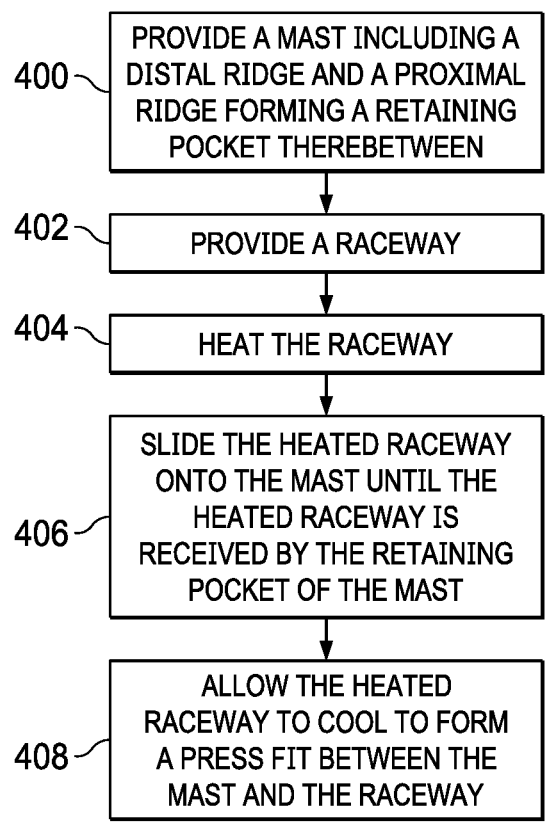
FIG. 6 is a flowchart of a method for assembling a mast having a nonintegral raceway for a rotorcraft in accordance with embodiments of the present disclosure.

Referring to FIG. 6 in the drawings, a method for assembling a mast and a nonintegral raceway for a rotorcraft is presented in flowchart form. The method includes providing a mast including a distal ridge and a proximal ridge forming a retaining pocket therebetween (step 400). The method includes providing and heating a raceway (steps 402 and 404). The method also includes sliding the heated raceway onto the mast until the heated raceway is received by the retaining pocket of the mast (step 406). The method includes allowing the heated raceway to cool to form a press fit between the mast and the raceway (step 408).

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly for a rotorcraft comprising:
    a mast including a distal ridge and a proximal ridge forming a retaining pocket therebetween;
    a raceway receivable by the retaining pocket to form a press fit between the mast and the raceway; and
    a mast bearing assembly including a plurality of bearings facing the mast to engage the raceway;
    wherein, the distal and proximal ridges are operable to reduce axial motion of the raceway along the mast, thereby securing the raceway in the retaining pocket.

2. The propulsion assembly as recited in claim 1 wherein the mast further comprises a material that is not case hardened.

3. The propulsion assembly as recited in claim 1 wherein the mast further comprises stainless steel.

4. The propulsion assembly as recited in claim 1 wherein the mast further comprises titanium.

5. The propulsion assembly as recited in claim 1 wherein the distal and proximal ridges extend circumferentially around the mast.

6. The propulsion assembly as recited in claim 1 wherein the raceway is nonintegral with the mast.

7. The propulsion assembly as recited in claim 1 wherein the raceway is formed from a different material than the mast.

8. The propulsion assembly as recited in claim 1 wherein the raceway further comprises a hardened raceway.

9. The propulsion assembly as recited in claim 1 wherein the raceway further comprises a through hardened raceway.

10. The propulsion assembly as recited in claim 1 wherein the raceway is thermally fitted onto the mast.

11. The propulsion assembly as recited in claim 1 wherein the raceway further comprises an annular raceway.

12. The propulsion assembly as recited in claim 1 wherein the raceway further comprises an inner surface having distal and proximal tapered edges.

13. The propulsion assembly as recited in claim 1 wherein the raceway further comprises an outer surface having distal and proximal tapered edges.

14. The propulsion assembly as recited in claim 1 wherein the raceway further comprises one of 52100 alloy steel or M50 alloy steel.

15. A rotorcraft comprising:
    a fuselage; and
    a propulsion assembly coupled to the fuselage, the propulsion assembly including:

a mast including a distal ridge and a proximal ridge forming a retaining pocket therebetween;

a raceway receivable by the retaining pocket to form a press fit between the mast and the raceway; and a mast bearing assembly including a plurality of bearings facing the mast to engage the raceway;

wherein, the distal and proximal ridges are operable to reduce axial motion of the raceway along the mast, thereby securing the raceway in the retaining pocket.

16. The rotorcraft as recited in claim 15 wherein the rotorcraft further comprises a helicopter and the propulsion assembly further comprises a main rotor assembly.

17. The rotorcraft as recited in claim 15 wherein the rotorcraft further comprises a tiltrotor aircraft, further comprising:

a wing supported by the fuselage and including first and second outboard ends;

wherein the propulsion assembly further comprises first and second propulsion assemblies each coupled to a respective outboard end of the wing, the mast of each propulsion assembly rotatable relative to the fuselage between a plurality of positions including a substantially horizontal orientation in a forward flight mode and a substantially vertical orientation in a vertical takeoff and landing flight mode.

18. A method for assembling a propulsion assembly of a rotorcraft comprising:

providing a mast including a distal ridge and a proximal ridge forming a retaining pocket therebetween;

providing an raceway that is formed from a different material than the mast and is hardened;

heating the raceway;

thermally fitting the heated raceway onto the mast until the heated raceway is received by the retaining pocket of the mast; and allowing the heated raceway to cool to form a press fit between the raceway and the mast.

19. The method as recited in claim 18 further comprising forming distal and proximal tapered edges on an inner surface and an outer surface of the raceway.

20. The method as recited in claim 18 wherein providing the mast further comprises providing a mast formed from a material that is not case hardened and is selected from the group consisting of stainless steel and titanium and wherein providing the raceway further comprises providing a raceway formed from a material selected from the group consisting of 52100 alloy steel and M50 alloy steel.

* * * * *